(12) United States Patent
McKelvie et al.

(10) Patent No.: US 10,122,907 B1
(45) Date of Patent: *Nov. 6, 2018

(54) INTEGRATION OF TRANSDUCER OUTPUTS IN A CONFERENCING SYSTEM

(71) Applicant: Xevo Inc., Bellevue, WA (US)

(72) Inventors: Samuel McKelvie, Seattle, WA (US); John Ludwig, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,715

(22) Filed: Nov. 3, 2017

Related U.S. Application Data

(63) Continuation of application No. 15/043,479, filed on Feb. 12, 2016, now Pat. No. 9,826,138.

(60) Provisional application No. 62/115,622, filed on Feb. 12, 2015.

(51) Int. Cl.
| | |
|---|---|
| H04N 7/15 | (2006.01) |
| H04N 5/232 | (2006.01) |
| H04N 5/247 | (2006.01) |
| H04N 5/235 | (2006.01) |
| H04N 5/225 | (2006.01) |
| G06T 1/20 | (2006.01) |
| H04N 7/14 | (2006.01) |

(52) U.S. Cl.
CPC ........... *H04N 5/23206* (2013.01); *G06T 1/20* (2013.01); *H04N 5/2259* (2013.01); *H04N 5/2353* (2013.01); *H04N 5/23229* (2013.01); *H04N 5/23296* (2013.01); *H04N 5/247* (2013.01); *H04N 7/147* (2013.01); *H04N 7/15* (2013.01)

(58) Field of Classification Search
USPC .............................................. 348/14.01–14.09
See application file for complete search history.

(56) References Cited

U.S. PATENT DOCUMENTS

| | | | | |
|---|---|---|---|---|
| 5,689,553 | A * | 11/1997 | Ahuja | H04L 12/1822 348/14.09 |
| 9,407,675 | B1 * | 8/2016 | Ludwig | H04L 65/4038 |
| 2005/0213656 | A1 * | 9/2005 | Liu | G06F 17/30843 375/240.01 |
| 2011/0261142 | A1 * | 10/2011 | Shanmukhadas | H04N 7/15 348/14.1 |
| 2013/0188007 | A1 * | 7/2013 | Duong | H04N 7/15 348/14.08 |
| 2014/0104448 | A1 * | 4/2014 | Sheeley | H04N 5/222 348/211.8 |
| 2014/0118541 | A1 | 5/2014 | Lasko | |
| 2015/0215586 | A1 | 7/2015 | Lasko | |
| 2016/0112469 | A1 | 4/2016 | Liu | |

\* cited by examiner

*Primary Examiner* — Maria El-Zoobi

(57) ABSTRACT

The video processing capabilities of multiple cameras are aggregated into a first graphics processing unit resource pool, wherein at least a first camera of the first graphics processing unit processes, into a first camera output, a raw video feed output by a second camera of the first graphics processing unit. The first camera output is processed raw video of the second camera and video from the first camera. The first camera output and output video feeds of other cameras of the plurality of cameras are transformed into a virtual video feed, which is analyzed by a master video processor that controls the first graphics processing unit resource pool to improve quality or content of the virtual video feed.

16 Claims, 4 Drawing Sheets

INTEGRATION OF TRANSDUCER OUTPUTS IN A CONFERENCING SYSTEM

CROSS-REFERENCE TO RELATED APPLICATIONS

This application claims priority and benefit as a continuation of U.S. application Ser. No. 15/043,479 filed on Feb. 12, 2016, which claims priority under 35 U.S.C. 119(e) to U.S. provisional application No. 62/115,622, filed on 12 Feb. 2015 and incorporated herein by reference in its entirety.

BACKGROUND

An explosion of content creation is taken place at the edges of data networks. High definition cameras, microphones, and other sensors are flooding networks with more and more data, most of which is not relevant or of particular interest.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Embodiments of a multifeed video processor are described that combines raw video feeds from a group of cameras to produce one or more combined feeds. The transform fabric logic is adapted to switch one or more of the raw video feeds and the combined feed to a graphics processing unit, and to receive from the graphics processing unit a transformed feed. The multifeed video processor may then combine the transformed feed with one or more of the combined feed and the raw video feeds to produce a virtual feed.

The virtual feed is provided to a control unit that analyzes the virtual feed for compliance with a relevance metric (a threshold level of relevant material per unit of video play time, for example), and controls the production of the virtual feed in order to increase compliance of the virtual feed with the relevance metric.

In some embodiments, the transform fabric logic may cooperate with the graphics processing unit to perform one or more of color depth reduction, resolution, color content, frame size control, or frame rate control of one or more of the raw video feeds or the combined feed.

In some embodiments, the control unit controls production of the virtual feed according to a relevance policy that is parametrically defined. The relevance policy may include semantic compression definitions in some cases. The control unit may adapt production of the raw video feeds by the group of cameras directly, in order to increase compliance of the virtual feed with the relevance metric. The control unit directing one or more of a pan, tilt, exposure, video frame boundaries, resolution, or zoom of one or more camera of the group of cameras. One or more of the cameras may include a camera graphics processing unit configured to carry out control commands from the control unit.

In some embodiments, the multifeed video processor may further include the transform fabric logic adapted to form the combined feed by multiplexing the raw video feeds and imposing a video layout on a multiplex of the raw video feeds comprised by the combined feed.

In some embodiments, the multifeed video processor may include a hierarchy of a group of multifeed video processors, in which the hierarchy of a group of multifeed video processors includes a group of graphics processing units. A master control unit may be configured to perform load balancing of the group of graphics processing units.

DRAWINGS

Figure 1:
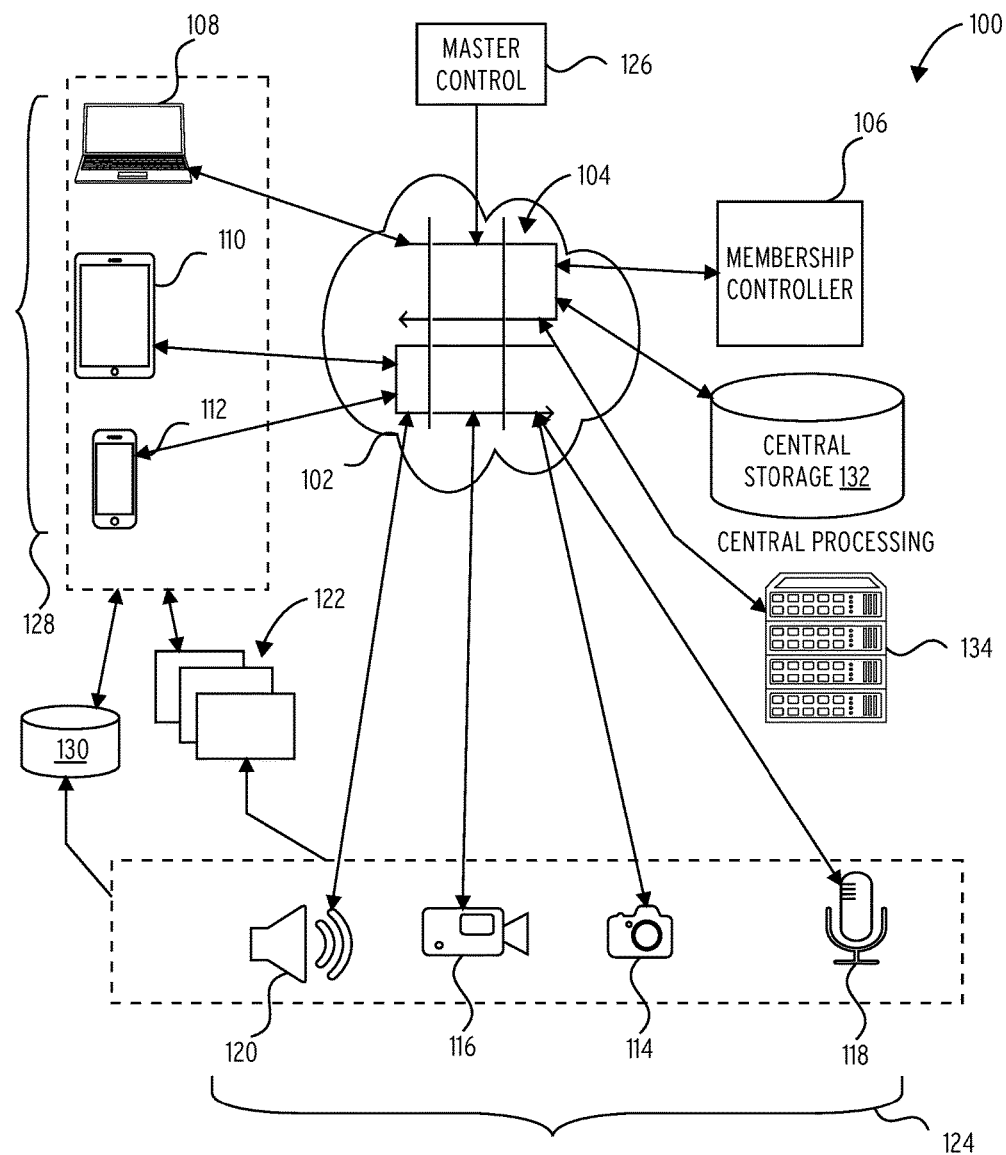
FIG. 1 illustrates an embodiment of a distributed sensor feed processing system 100.

FIG. 1 illustrates an embodiment of a distributed sensor feed processing system 100. The distributed sensor feed processing system 100 comprises an intelligent routing fabric 104, a central storage 132, a central processing 134, a master control 126, a membership controller 106, various sensors and transducers 124 (e.g., speaker 120, video camera 116, still frame camera 114, and microphone 118), edge storage 130, and an edge GPU pool 122.

Various mobile devices (e.g., mobile computer 108, tablet device 110, and mobile phone 112) interface on a temporary basis with the distributed sensor feed processing system 100 and communicate with one another and with the system's sensors and transducers 124 via the routing fabric 104. Under control of the master control 126 the edge GPU pool 122 processes measurements and recorded data from the sensors and transducers 124 using secure message queues. Some elements of the edge GPU pool 122 may be distributed among the sensors and transducers 124. The edge GPU pool 122 may operate autonomously or semi-autonomously from the central processing 134 and master control 126.

The membership controller 106 authenticates, joins, and un-joins various end user devices 128 that enter and leave the distributed sensor feed processing system 100.

The distributed sensor feed processing system 100 utilizes the edge storage 130 and edge GPU pool 122 to receive and store sensor readings, particularly video streams, and only copies the high resolution video via the wide area network 102 to the routing fabric 104 for selective operatings such as video editing. The edge GPU pool 122 cooperates with the central processing 134 to enable editing and viewing with reduced latency and bandwidth utilization via the wide area network 102.

The distributed sensor feed processing system 100 may operate the edge GPU pool 122 to provide bandwidth shaping and bandwidth management for LANs (e.g., LANs comprising the end user devices 128 and/or the sensors and transducers 124 and for an Internet Service Provider (ISP) providing connectivity between the LANs and the wide area network 102.

The distributed sensor feed processing system 100 may operate the edge GPU pool 122 to implement high compression rates on video feeds that include a characteristically unchanging or very slowly changing background. The compression algorithms used are related to but may include qualitative differences from H.264. The compression algorithms used leverage archival streams of the scene stored by the central storage 132. The video streams produced from the new compression algorithms may be merged into standard H.264 streams for download and viewing by the end user devices 128.

The edge GPU pool 122 may include logic to process feeds from the video camera 116 and to remove from the feeds representations of objects or people that violate privacy settings put into effect by the master control 126.

The distributed sensor feed processing system 100 may implement a distributed operating system for distributed cameras, for example via cooperation of the central processing 134, edge GPU pool 122, and master control 126. The distributed operating system may enable programming and processing to be carried in a distributed fashion that allocates resources and bandwidth between the edge and the routing fabric 104/central storage 132 and the wide area network 102.

The distributed sensor feed processing system 100 may implement protocols for 2-way (point to point) data exchange between the video camera 116 and other video cameras (e.g., stand-alone video cameras or cameras integral with one or more of the end user devices 128). The protocol may be implemented on the "edge" using edge GPU pool 122 or may take place via the wide area network 102 and routing fabric 104.

In one mode of operation, the edge GPU pool 122 receives one or more raw feeds (RF) from the sensors and transducers 124 and in response performs a transformation/combination involving the raw feeds. Transformations on the raw feeds carried out by the edge GPU pool 122 may include combining (e.g., multiplexing) feeds, reducing the frame rate of feeds, reducing the number of pixels in a feed, extracting sub-regions (e.g., rectangular portions) of feeds, and reducing the frame size of feeds. A result of the transformations is one or more combined feed (CF) which represents possibly multiple raw feeds and also possibly transformed feeds (TF) from the edge GPU pool 122.

Examples of more advanced processing by the edge GPU pool 122 include color depth transformations, extracting polygon regions from the video, and rotation of polygon regions from the video. This processing results in a transformed feed (TF) which may then be combined with raw feeds or combined feeds (314). The resulting output is one or more virtual feeds (VF), representing combinations of raw and/or transformed data from one or multiple raw, combined, and transformed feeds.

The direction and composition of raw feeds into virtual feeds is a result of high-level policies implemented in logic of the master control 126. These policies are typically designed to maximize a relevance metric of the virtual feeds by directing production of the raw feeds (e.g., by controlling camera angle, zoom, and pan), by eliminating or reducing irrelevant data from the raw feeds, and by combining the most relevant data from the raw feeds to produce a single highly relevant concentrated virtual feed. These policies for maximizing relevance are translated into control commands (CTRL) to the sensors and transducers 124, and to director commands (CTRL) to the wide area network 102/routing fabric 104, and transform/processing modifications to the edge GPU pool 122.

The master control 126 receives one or more virtual feeds (VF) from the edge GPU pool 122 via the wide area network 102/routing fabric 104 and in response transforms analyzes the virtual feed for relevance as directed by logic implementing relevance policies. In some embodiments, one or more of the sensors and transducers 124 may analyze and transform raw video utilizing a native GPU (e.g., a GPU of the edge GPU pool 122) and/or a processor to convert the raw video to metadata. Examples of the analysis include identifying objects and people in the virtual feed, identifying text in the virtual feeds, identifying motion in the virtual feeds, and identifying and removing background that is none of these. The master control 126 or edge GPU pool 122 may convert portions of the virtual feed into metadata, for example replacing backgrounds with a reference to a still image, or replacing a person's or object's motion with a parametric description of the motion.

The master control 126 may then make adjustments to one or more of the routing fabric 104, edge GPU pool 122, or sensors and transducers 124 to improve the relevance metric of the virtual feed. For example the master control 126 may generate (302) a control signal CTRL to one or more of the sensors and transducers 124, or a processing algorithm adjustment to the edge GPU pool 122, or a feed re-routing control to the routing fabric 104. In response to a control from the master control 126, the sensors and transducers 124 may alter the real feed at the capture source, for example by panning, zooming, tilting, or by performing some image processing such as reduction in resolution or color depth. The edge GPU pool 122 may in response alter a transformation of a resulting raw feed from the sensors and transducers 124.

Figure 2:
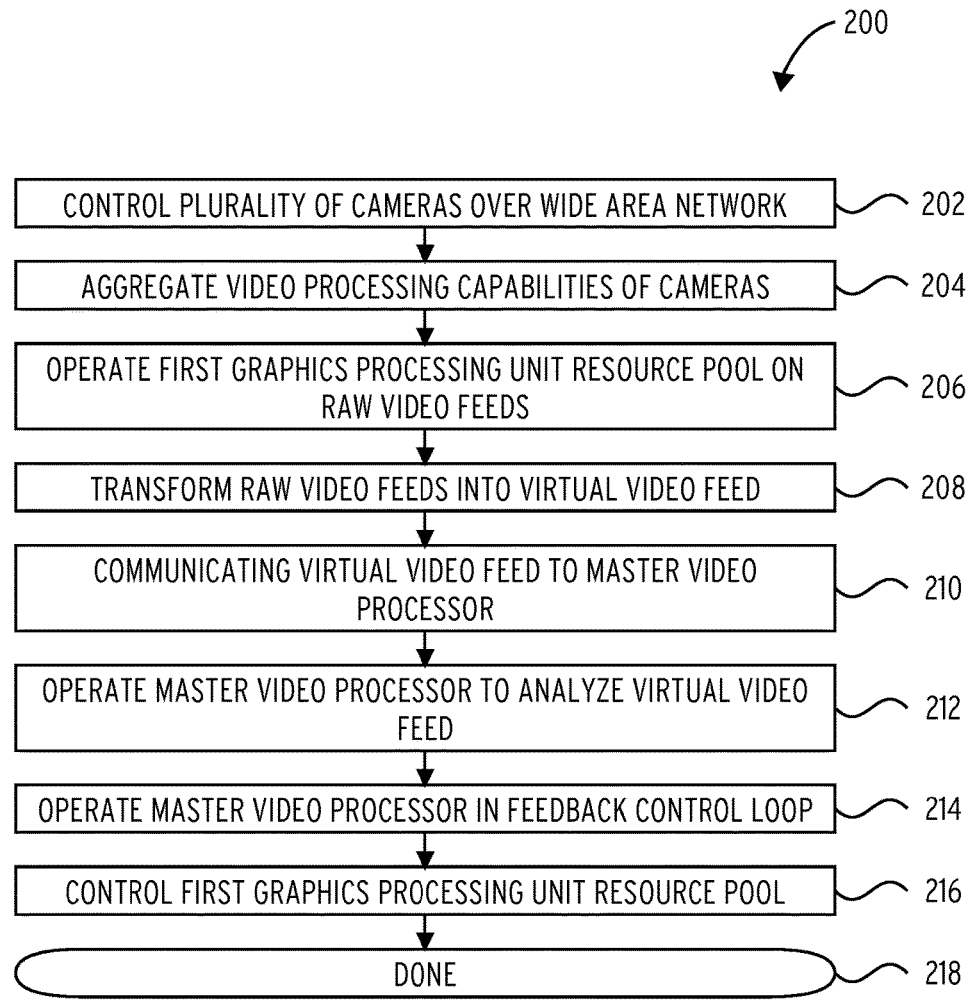
FIG. 2 illustrates a routine 200 in accordance with one embodiment.

Referring to FIG. 2, in block 202, routine 200 controls a plurality of cameras over a wide area network. In block 204, routine 200 aggregates video processing capabilities of cameras. In block 206, routine 200 operates a first graphics processing unit resource pool on raw video feeds. In block 208, routine 200 transforms the raw video feeds into a virtual video feed. In block 210, routine 200 communicating the virtual video feed to a master video processor. In block 212, routine 200 operates the master video processor to analyze the virtual video feed. In block 214, routine 200 operates the master video processor in a feedback control loop. In block 216, routine 200 controls the first graphics processing unit resource pool. In done block 218, routine 200 ends.

Accordingly, multiple cameras may be controlled over a wide area network in a routine that includes aggregating video processing capabilities of the cameras into a first graphics processing unit resource pool. The first graphics processing unit resource pool is operated on raw video feeds of the cameras to combine and transform the raw video feeds into a virtual video feed, wherein at least one camera of the cameras processes a raw video feed output by a different camera of the cameras. The virtual video feed is communicated over the wide area network to a master video processor, which is operated in a feedback loop to analyze the virtual video feed and control the first graphics processing unit resource pool to improve one of a quality or a content of the virtual video feed.

The master video processor may be operated on the virtual video feed for compliance of the virtual video feed with a relevance metric, and to control the production of the virtual video feed in order to increase compliance of the virtual video feed with the relevance metric.

The master video processor may be operated to control production of the raw video feeds by the cameras directly, in order to increase compliance of the virtual video feed with the relevance metric.

The master video processor may be operated to direct one or more of a pan, tilt, exposure, video frame boundaries, resolution, or zoom of one or more of the cameras in order to adapt the virtual video feed to fit the relevance metric.

The master video processor may be operated in the feedback control loop to control the first graphics processing unit resource pool to perform one or more of color depth reduction, resolution, color content, frame size control, or frame rate control on the raw video feeds.

The master video processor may be operated to control production of the virtual video feed according to a relevance policy that is parametrically defined. The relevance policy comprising semantic compression definitions.

The master video processor may be operated to cause the first graphics processing unit resource pool to multiplex the raw video feeds and impose a video layout on a resulting multiplex of the raw video feeds.

Figure 3:
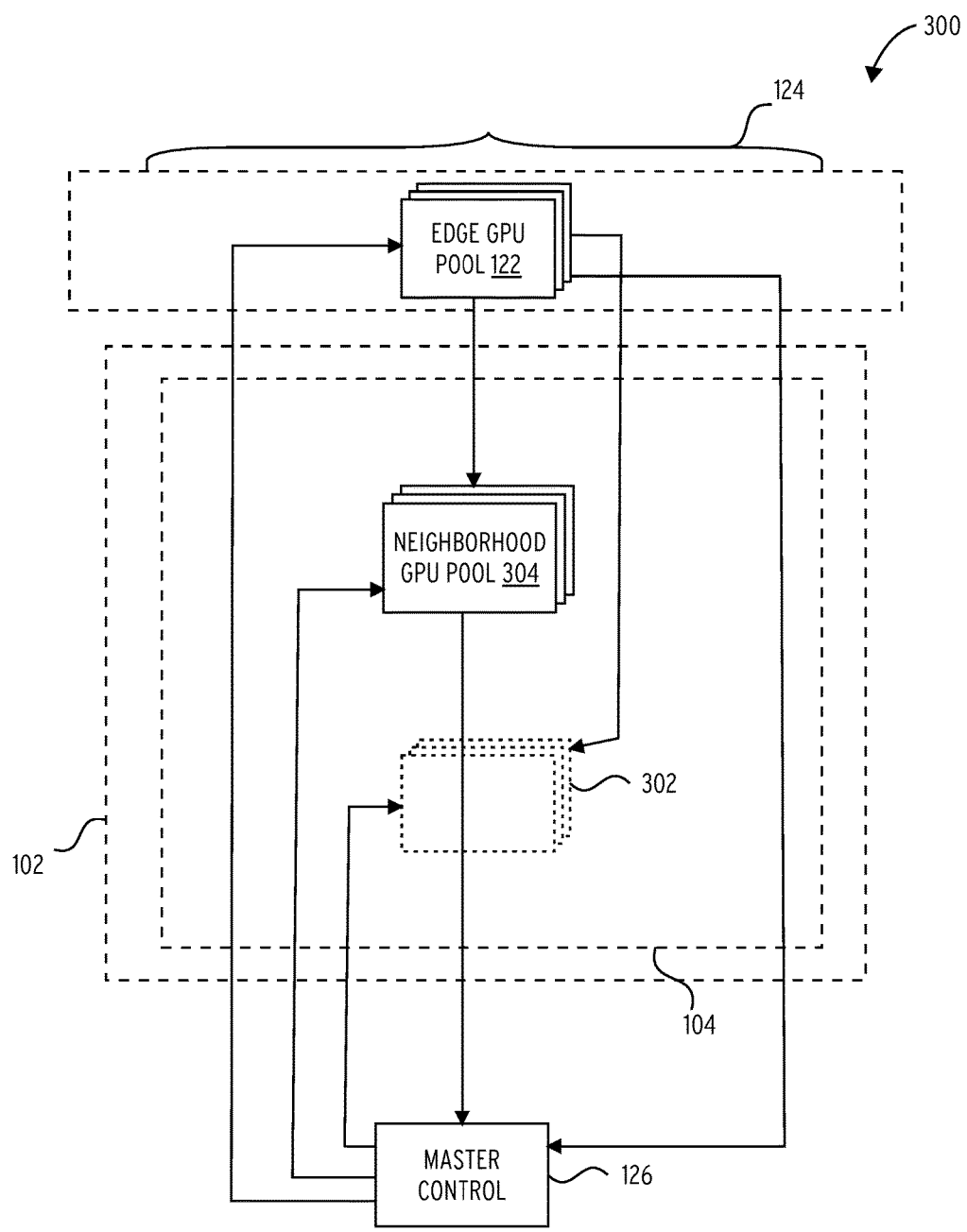
FIG. 3 illustrates a system 300 in accordance with one embodiment.

An embodiment of a system 300 is illustrated in FIG. 3. The system 300 provides geographically-prioritized feed processing for sensors and transducers 124. Allocation of feed processing to distinct resource pools in geographic areas of different scope is controlled by the master control 126. An edge GPU pool 122 is aggregated among the sensors and transducers 124 that are actually generating the raw feeds.

The edge GPU pool 122 receives raw feeds from the sensors and transducers 124 and in response does one or more of combine and transform the raw feeds into combined feeds or virtual feeds. The edge GPU pool 122 may also, by way of control of the wide area network 102 and routing fabric 104 by the master control 126, receive combined or virtual feeds to combine and further process from any one or more of the neighborhood GPU pool 304 or regional GPU pool 302. (The regional GPU pool 302 is illustrated as optional in this example hierarchy).

The neighborhood GPU pool 304, the regional GPU pool 302, or both receive one or more virtual feeds from the edge GPU pool 122 and in response combine and transform the virtual feeds with one or more other raw feeds, combined feeds, or virtual feeds to produce a virtual feed. The master control 126 analyzes the relevance of the virtual feed received from any one of the edge GPU pool 122, neighborhood GPU pool 304, or regional GPU pool 302, and makes real-time adjustments in the form of control commands CTRL to these elements or the sensors and transducers 124. Receipt of a CTRL signal from the master control 126 causes any one of these elements to adapts the production of the raw feed or virtual feed that it produces.

Figure 4:
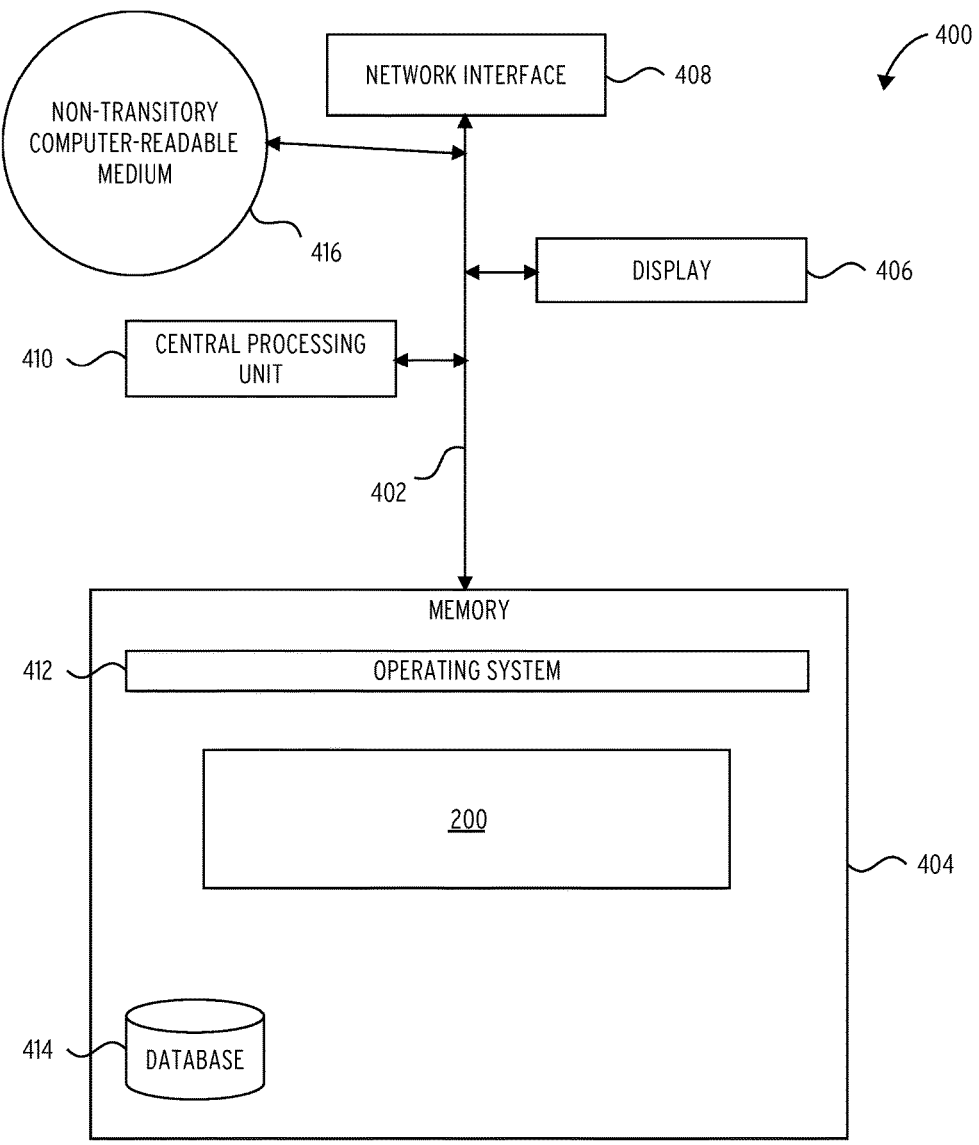
FIG. 4 illustrates a video processor 400 in accordance with one embodiment.

FIG. 4 illustrates several components of an exemplary video processor 400 in accordance with one embodiment. In various embodiments, video processor 400 may include a desktop PC, server, workstation, mobile phone, laptop, tablet, set-top box, appliance, or other computing device that is capable of performing operations such as those described herein. In some embodiments, video processor 400 may include many more components than those shown in FIG. 4. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, video processor 400 may comprise one or more physical and/or logical devices that collectively provide the functionalities described herein. In some embodiments, video processor 400 may comprise one or more replicated and/or distributed physical or logical devices.

In some embodiments, video processor 400 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Video processor 400 includes a bus 402 interconnecting several components including a network interface 408, a display 406, a central processing unit 410, and a memory 404.

Memory 404 generally comprises a random access memory ("RAM") and permanent non-transitory mass storage device, such as a hard disk drive or solid-state drive. Memory 404 stores an operating system 412.

These and other software components may be loaded into memory 404 of video processor 400 using a drive mechanism (not shown) associated with a non-transitory computer-readable medium 416, such as a floppy disc, tape, DVD/CD-ROM drive, memory card, or the like.

Memory 404 also includes database 414. In some embodiments, video processor 400 may communicate with database 414 via network interface 408, a storage area network ("SAN"), a high-speed serial bus, and/or via the other suitable communication technology.

In some embodiments, database 414 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method, comprising:
   aggregating video processing capabilities of a plurality of cameras into a first graphics processing unit resource pool;
   wherein at least a first camera of the first graphics processing unit processes, into a first camera output, a raw video feed output by a second camera of the first graphics processing unit, the second camera different than the first camera, the first camera output comprising processed raw video of the second camera and video from the first camera;
   operating the first graphics processing unit resource pool to combine and transform the first camera output and output video feeds of other cameras of the plurality of cameras into a virtual video feed;
   communicating the virtual video feed to a master video processor;
   operating the master video processor to analyze the virtual video feed; and
   operating the master video processor in a feedback control loop to control the first graphics processing unit resource pool to improve one of a quality or a content of the virtual video feed.

2. The method of claim 1, further comprising:
   operating the master video processor on the virtual video feed for compliance of the virtual video feed with a relevance metric; and
   operating the master video processor to control the production of the virtual video feed in order to increase compliance of the virtual video feed with the relevance metric.

3. The method of claim 2, further comprising:
   operating the master video processor to control production of the raw video feeds by the cameras directly, in order to increase compliance of the virtual video feed with the relevance metric.

4. The method of claim 2, further comprising:
   operating the master video processor to direct one or more of a pan, tilt, exposure, video frame boundaries, resolution, or zoom of one or more of the cameras in order to adapt the virtual video feed to fit the relevance metric.

5. The method of claim 1, further comprising:
operating the master video processor in the feedback control loop to control the first graphics processing unit resource pool to perform one or more of color depth reduction, resolution, color content, frame size control, or frame rate control on the raw video feeds.

6. The method of claim 1, further comprising:
operating the master video processor to control production of the virtual video feed according to a relevance policy that is parametrically defined.

7. The method of claim 6, further comprising:
the relevance policy comprising semantic compression definitions.

8. The method of claim 1, further comprising:
operating the master video processor to cause the first graphics processing unit resource pool to multiplex the raw video feeds and impose a video layout on a resulting multiplex of the raw video feeds.

9. A mobile computing system, comprising:
at least one processor; and
a memory storing instructions that, when executed by the at least one processor, configure the at least one processor to:
  control a plurality of cameras;
  aggregate video processing capabilities of the cameras into a first graphics processing unit resource pool;
  operate at least a first camera of the first graphics processing unit to process, into a first camera output, a raw video feed output by a second camera of the first graphics processing unit, the second camera different than the first camera, the first camera output comprising processed raw video of the second camera and video from the first camera;
  operate the first graphics processing unit resource pool to combine and transform the first camera output and output video feeds of other cameras of the plurality of cameras into a virtual video feed;
  communicate the virtual video feed to a master video processor;
  operate the master video processor to analyze the virtual video feed; and
  operate the master video processor in a feedback control loop to control the first graphics processing unit resource pool to improve one of a quality or a content of the virtual video feed.

10. The mobile computing system of claim 9, wherein the instructions further configure the at least one processor to:
  operate the master video processor on the virtual video feed for compliance of the virtual video feed with a relevance metric; and
  operate the master video processor to control the production of the virtual video feed in order to increase compliance of the virtual video feed with the relevance metric.

11. The mobile computing system of claim 10, wherein the instructions further configure the at least one processor to:
  operate the master video processor to control production of the raw video feeds by the cameras directly, in order to increase compliance of the virtual video feed with the relevance metric.

12. The mobile computing system of claim 10, wherein the instructions further configure the at least one processor to:
  operate the master video processor to direct one or more of a pan, tilt, exposure, video frame boundaries, resolution, or zoom of one or more of the cameras in order to adapt the virtual video feed to fit the relevance metric.

13. The mobile computing system of claim 9, wherein the instructions further configure the at least one processor to:
  operate the master video processor in the feedback control loop to control the first graphics processing unit resource pool to perform one or more of color depth reduction, resolution, color content, frame size control, or frame rate control on the raw video feeds.

14. The mobile computing system of claim 9, wherein the instructions further configure the at least one processor to:
  operate the master video processor to control production of the virtual video feed according to a relevance policy that is parametrically defined.

15. The mobile computing system of claim 14, wherein the instructions further configure the at least one processor to:
  the relevance policy comprising semantic compression definitions.

16. The mobile computing system of claim 9, wherein the instructions further configure the at least one processor to:
  operate the master video processor to cause the first graphics processing unit resource pool to multiplex the raw video feeds and impose a video layout on a resulting multiplex of the raw video feeds.

* * * * *